United States Patent
Lee et al.

(10) Patent No.: US 8,462,420 B2
(45) Date of Patent: Jun. 11, 2013

(54) TUNABLE PLASMONIC FILTER

(75) Inventors: Byounghee Lee, Wexford, PA (US); Byung Il Choi, Pittsburgh, PA (US)

(73) Assignee: NanoLambda, Inc., Pittsburgh, PA (US)

(*) Notice: Subject to any disclaimer, the term of this patent is extended or adjusted under 35 U.S.C. 154(b) by 342 days.

(21) Appl. No.: 12/521,416

(22) PCT Filed: Dec. 21, 2007

(86) PCT No.: PCT/US2007/026069
§ 371 (c)(1),
(2), (4) Date: Jun. 26, 2009

(87) PCT Pub. No.: WO2008/147403
PCT Pub. Date: Dec. 4, 2008

(65) Prior Publication Data
US 2010/0046060 A1    Feb. 25, 2010

Related U.S. Application Data (60) Provisional application No. 60/877,644, filed on Dec. 29, 2006.

(51) Int. Cl.
*G02F 1/01* (2006.01)

(52) U.S. Cl.
USPC ........................................................ 359/277

(58) Field of Classification Search
USPC ................. 359/277, 276, 278, 282, 284, 286, 359/287
See application file for complete search history.

(56) References Cited

U.S. PATENT DOCUMENTS

| | | | |
|---|---|---|---|
| 4,281,904 A * | 8/1981 | Sprague et al. | 359/263 |
| 4,637,689 A * | 1/1987 | Chang | 359/308 |
| 5,963,569 A * | 10/1999 | Baumgart et al. | 372/28 |
| 6,040,936 A * | 3/2000 | Kim et al. | 359/245 |
| 6,236,033 B1 | 5/2001 | Ebbesen et al. | |
| 6,862,396 B2 * | 3/2005 | Dickson et al. | 385/129 |
| 6,891,322 B2 | 5/2005 | Lee et al. | |

(Continued)

FOREIGN PATENT DOCUMENTS

| | | |
|---|---|---|
| JP | 2004-070288 A | 3/2004 |
| KR | 10-2002-0065281 A | 8/2002 |
| KR | 10-2004-094580 A | 11/2004 |

OTHER PUBLICATIONS

E. A. Shaner et al, "Electrically tunable extraordinary optical transmission gratings", Applied Physics Letters, vol. 91, (2007) pp. 181110-1 through 181110-3.*

(Continued)

*Primary Examiner* — Tuyen Tra
(74) *Attorney, Agent, or Firm* — The Marbury Law Group PLLC

(57) ABSTRACT

A tunable plasmonic filter or an optical filtering method discloses plasmonic filter structure and a voltage or current source. An intensity or wavelength of light transmitted through the filter structure is modulated by the intensity of a voltage or current from the voltage or current source. The plasmonic filter structure is located between electrodes electrically connected to the voltage or current source. The plasmonic filter structure is configured such that the incident light is resonant with at least one plasmonic mode on the structure, and a predetermined wavelength will perturb the metallic plasmonic structure in surface plasmon on energy bands for the wavelength selective transmission of light.

13 Claims, 8 Drawing Sheets

U.S. PATENT DOCUMENTS

| | | | |
|---|---|---|---|
| 6,992,826 B2 | 1/2006 | Wang | |
| 7,053,523 B1 * | 5/2006 | Ballato et al. | 310/313 B |
| 7,315,426 B2 | 1/2008 | Kim et al. | |
| 7,420,156 B2 | 9/2008 | Kim et al. | |
| 7,426,040 B2 | 9/2008 | Kim et al. | |
| 7,456,383 B2 | 11/2008 | Kim et al. | |
| 7,701,629 B2 * | 4/2010 | Wang et al. | 359/248 |
| 7,880,251 B2 * | 2/2011 | Wang et al. | 257/431 |
| 2003/0206708 A1 | 11/2003 | Estes et al. | |
| 2005/0161589 A1 | 7/2005 | Kim et al. | |
| 2006/0273245 A1 | 12/2006 | Kim et al. | |
| 2009/0073434 A1 | 3/2009 | Kim et al. | |

OTHER PUBLICATIONS

C. Janke, et al, "All-Optical switching of the transmission of electromagnetic radiation through subwavelength apertures", Optical Society of America, vol. 30, No. 18, 2005, pp. 2357-2359.*

U.S. Appl. No. 12/521,376, filed Dec. 21, 2007, Lee et al.

U.S. Appl. No. 12/521,400, filed Dec. 21, 2007, Lee et al.

International Search Report dated Mar. 14, 2008, in PCT/US2007/026135, 2 pages.

International Search Report dated Jun. 2, 2008, in PCT/US2007/026069, 2 pages.

* cited by examiner

LD + modulator

Figure 8

TUNABLE PLASMONIC FILTER

CROSS-REFERENCE TO RELATED PATENT APPLICATIONS

The present application is a National Stage of PCT/US2007/026069, filed Dec. 21, 2007, which claims benefit of U.S. provisional application 60/877,644, filed Dec. 29, 2006, which are incorporated herein by reference in their entirety.

BACKGROUND OF THE INVENTION

Optical filtering is an important concept in optics, and is commonly involved in a variety of optical components and instruments. One example is to use optical filters for a flat panel display. A flat panel display uses a light source, a tunable optical switch and a color filter. Liquid crystal is typically used to modulate the intensity of the light through a pixel. However, the response time of liquid crystal is much slower than that of a typical electronics circuit. And color filters are also used to select a specific spectral range for the pixel. Because of the spectral broadness and spectral irregular shape of the filter, the color quality is hard to control. Therefore it would be much more useful to have a material or a device that selectively transmits light only in a narrow range of frequencies within a broad spectrum and dynamically with a faster control mechanism.

Filters made from wire-mesh or metallic grids have been used extensively for filtering light in the far IR (infrared) spectrum. Such filters and devices incorporating the filters are disclosed in U.S. application Ser. Nos. 10/566,946 (now U.S. Pat. No. 7,456,383) and 11/345,673 (now U.S. Pat. No. 7,420,156) filed on Jul. 22, 2004 and Feb. 2, 2006, respectively, both of which are incorporated herein by reference in their entirety. These filters comprise thin metallic wires (much thinner than the wavelengths to be transmitted) deposited on an optically transparent substrate. The filters are characterized by a transmission spectrum having a peak at approximately 1.2 times the periodicity of the mesh. The peak is very broad and fixed, typically greater than half of the periodicity of the mesh. These filters would be much more useful if their transmission spectra could be modulated fast and narrowed to make them more selective.

SUMMARY OF THE INVENTION

A tunable plasmonic filter is made of a negative dielectric constant material, such as a metal has plasmonic structures of subwavelength scale, and a control circuit. The plasmonic structures are configured such that when light is incident on the array structures, at least one plasmon mode is resonant with the incident light to produce a transmission spectral window with desired spectral profile, bandwidth and beam shape. Such intensity or wavelength of the transmission spectral is modulated by the signal, such as a voltage or current, which is applied directly to, indirectly to or between portions of the metal plasmonic filter. The tunable plasmonic filters can be used as various wavelength filtering devices, optical switching devices and optical modulator devices for multispectral image sensor, chip scale spectrometer, color flat panel display, and for laser modulator.

DETAILED DESCRIPTION OF THE PREFERRED EMBODIMENTS

Unless otherwise specified, the words "a" or "an" as used herein mean "one or more". The term "light" includes visible light as well as UV and IR radiation. The invention includes the following embodiments.

Figure 1:
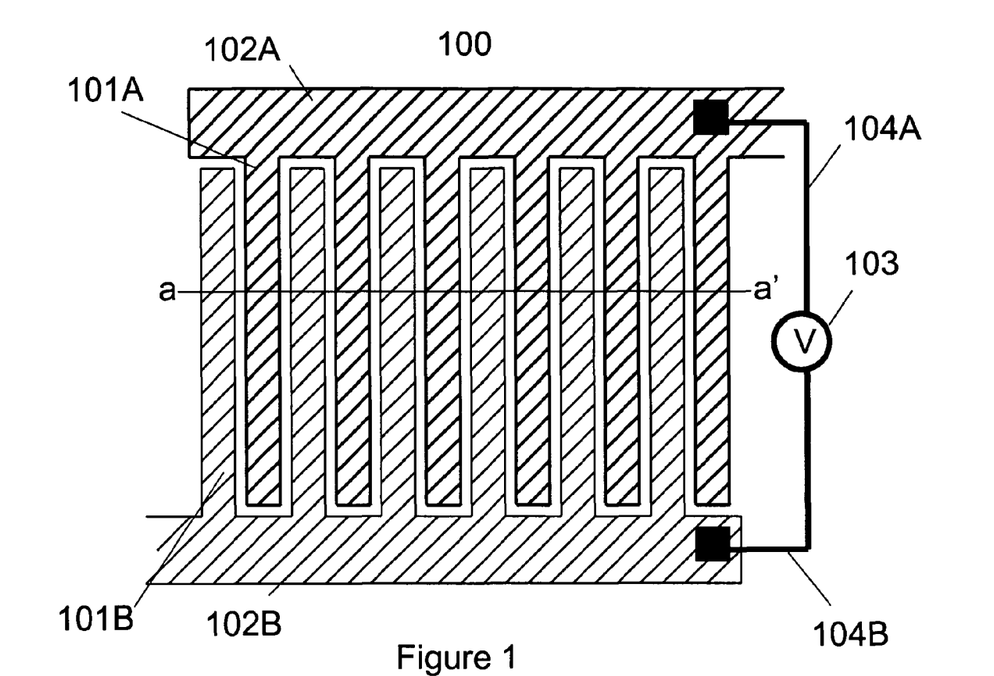
FIG. 1 is a graphical representation of a tunable plasmonic filter.

FIG. 1 illustrates a first embodiment of the invention in which a control voltage or current is applied between portions of the metal plasmonic filter. In FIG. 1, a plasmonic tunable filter 100 contains interdigitated metal island or finger structures 101, such as subwavelength island structures separated from each other by subwavelength gaps. The first set of islands or fingers 101A are electrically connected together by a metal connector 102A. The second set of islands or fingers 101B are electrically connected together by a metal connector 102B. The metal may be any metal and is preferably Ag, Au, Cr or Al or alloys thereof. A voltage or current source 103 is connected to each set of islands or fingers via separate leads 104A and 104B. Thus, one output of the voltage or current source is connected to the first part 101A/102A of interdigitated plasmonic filter structure and the other output is connected to the second part 101B/102B of the interdigitated plasmonic filter structure. The voltage or current source 103 is controlled by a control device (not shown), such as a computer and/or a dedicated control circuit or chip. The intensity of the control signal (i.e., the control voltage or current from source 103) can be dynamically increased or decreased at a fast speed, in a linear fashion or in a multi step fashion and the intensity of the control signal modulates the intensity of the transmission light.

Figure 2:
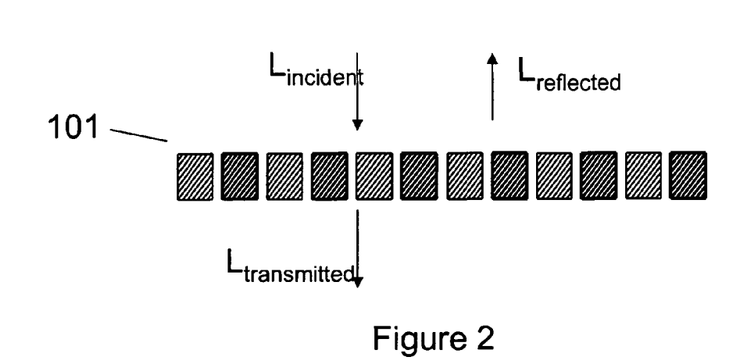
FIG. 2 is a cross sectional view of a tunable plasmonic filter shown in FIG. 1.
Figure 3A:
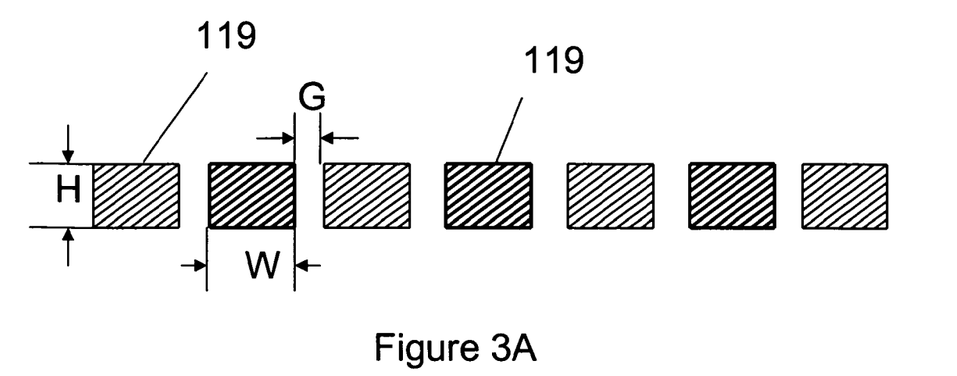
FIG. 3A is a schematic representation of the cross sectional view shown in FIG. 2, of the tunable plasmonic filter shown in FIG. 1.

In FIG. 2, the intensity of the incident light is $L_{incident}$, the intensity of the reflected light is $L_{reflected}$ and the intensity of the transmitted light after traveling through the gaps in the plasmonic structures and film is $L_{transmitted}$. In FIG. 2, an unsupported thin metal plate is shown. However, a thin metal film deposited on an optically transparent substrate, such as a glass, quartz or polymer, is also contemplated by the present invention. In FIG. 3A, the gap between each subwavelength scale plasmonic structure 119 of the array of structures 101 is G. The width and height of the plasmonic structures are W, and H respectively.

While interdigitated island or finger type plasmonic structures are shown in FIGS. 1-3, other plasmonic structure configurations may be used instead. For example, FIGS. 4C, 4D and 4E show different configuration of plasmonic structures. FIG. 4C shows a metal embossing array (i.e., upraised metal plasmonic structure array) on a metal film. If desired, optional apertures may be provided through the metal film in the gap regions between the embossing structures. Alternatively, the metal film may be sufficiently thin (i.e., 30 nm or less) to be partially optically transparent in the gap regions. FIG. 4D shows a plurality of non-interdigitated subwavelength size metal islands separated by subwavelength sized slit shaped gaps. FIG. 4E shows a metal film comprising multiple subwavelength apertures. These plasmonic structures (including upraised structures, islands and/or apertures) are configured such that the incident light is resonant with at least one plasmon mode on the structures in said metal film or metal islands, and the predetermined wavelength will perturb the metallic plasmonic structures in surface plasmon energy bands for the wavelength selective transmission of light.

The plasmonic structures 101 may be formed by any suitable method. For example, the structures 101 in FIG. 4C may be formed by embossing grooves into the film to form the gaps G. Alternatively, the structures may be formed by photolithographic etching of the gaps G in the film. Alternatively, the structures 101 may be formed by direct deposition of the structures 101 on the metal film 100 or by forming a metal layer on the film 100 and patterning the layer into the structures 101. Alternatively, the structures 101 may be formed by electroplating or electroless plating. Alternatively, the structures 101 may be formed by combination of aforementioned methods.

Figure 3B:
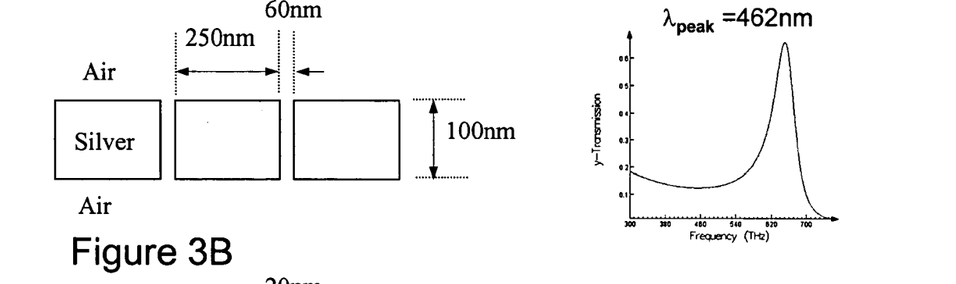
FIGS. 3B, 3C and 3D show graphical representation of transmission intensity as a function of wavelength for different filter geometries.
Figure 3C:
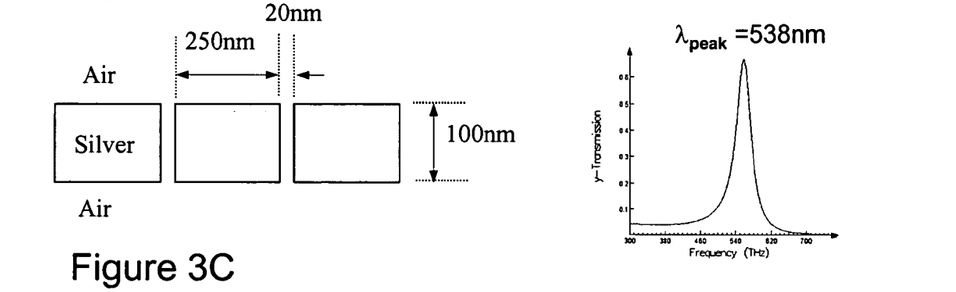
Figure 3D:
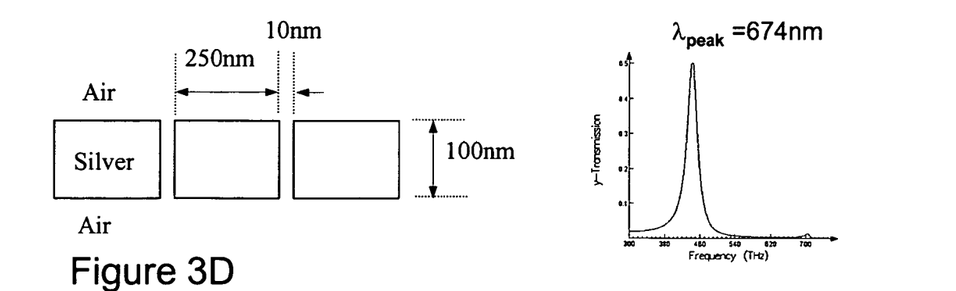

The plasmonic structures shown in FIG. 3A, exhibit distinct transmission spectra with well defined peaks, as shown in FIGS. 3B, 3C and 3D. The power level of transmitted light is much greater than the expected power level from conventional theory. FIGS. 3B, 3C, and 3D show FDTD simulations which indicate that the unusual optical properties are probably due to the resonance of the incident light with the surface plasmons of the plurality of islands structure in metal. It is possible that other phenomena, such as interference due to array geometry, also contributes to the wavelength selective enhanced transmission.

In FIG. 3B, the solid line represents transmission of light with peak wavelength of 462 nm through an array of plasmonic structures (a plurality of metal islands), with features 119 shown in FIG. 3A, having height of 100 nm, width of 200 nm and 60 nm gap G between features 119 shown in FIG. 3A. In FIG. 3C, the solid line represents transmission of light with peak wavelength of 538 nm through an array of plasmonic structures (a plurality of metal islands), with features 119 shown in FIG. 3A, having height of 100 nm, width of 250 nm and 20 nm gap G between features 119 shown in FIG. 3A. In FIG. 3D, the solid line represents transmission of light with peak wavelength of 674 nm through an array of plasmonic structures (a plurality of metal islands), with features 119 shown in FIG. 3A, having height of 100 nm, width of 250 nm and 10 nm gap G between features 119 shown in FIG. 3A.

Figure 4A:
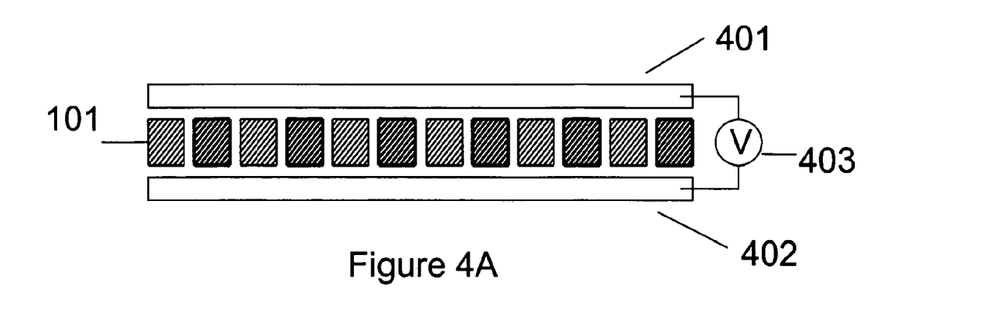
FIG. 4A is a graphical representation of an alternative configuration of a tunable plasmonic filter.

FIG. 4A illustrates an alternative configuration of tunable plasmonic filter according to a second embodiment of the invention, in which a control voltage or current is applied indirectly to the metal plasmonic filter structure array. In this configuration, the voltage is applied from a voltage source 403 to electrically conductive electrodes, such as plates 401, 402 located adjacent to the plasmonic metal filter structure array 101. For example, the plates 401, 402 may be located on the opposite sides of the array 101 and be connected to opposite polarity outputs of the voltage source 403.

For display applications, one or both plates 401 and 402 may comprise optically transparent and electrically conductive plates. For example, the plates may comprise a transparent, conductive material, such as indium tin oxide or aluminum zinc oxide, or a composite material comprising an insulating transparent matrix, such as a polymer matrix, and an electrically conductive filler, such as metal wires or carbon nanotubes. While plate shaped electrodes 401 and 402 are illustrated, the electrodes may have any other shapes, such as grids, bars, etc. The electrodes preferably do not directly contact the plasmonic structure array 101, but are positioned in such a way that the array 101 is located in the potential field between the electrodes. The intensity of the control signal can be dynamically increased or decreased at a fast speed, in a linear fashion or in a multi step fashion and its intensity modulates the intensity of the transmission light.

Figure 4B:
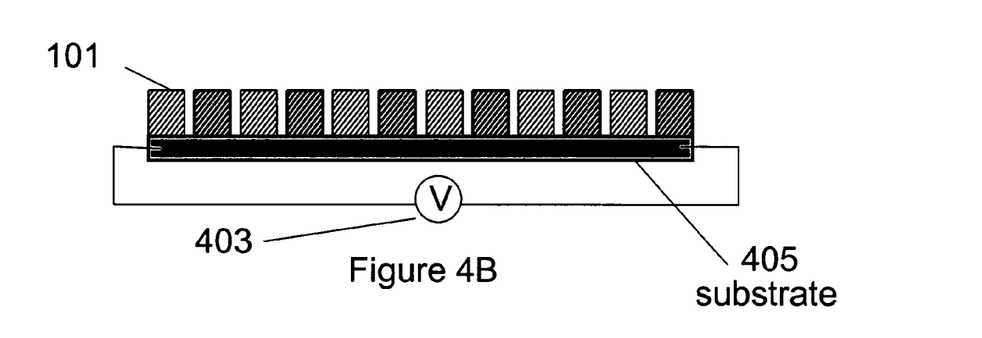
FIG. 4B is a graphical representation of an alternative configuration of a tunable plasmonic filter.
Figure 4C:
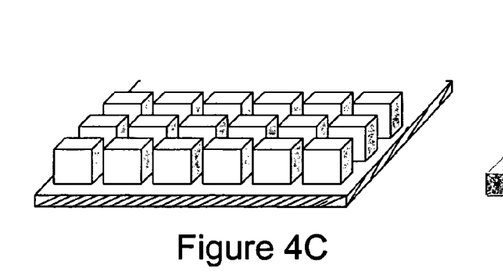
FIGS. 4C, 4D and 4E are perspective views of different plasmonic structures of tunable plasmonic filter.
Figure 4D:
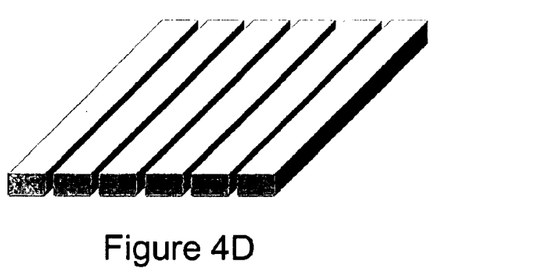
Figure 4E:
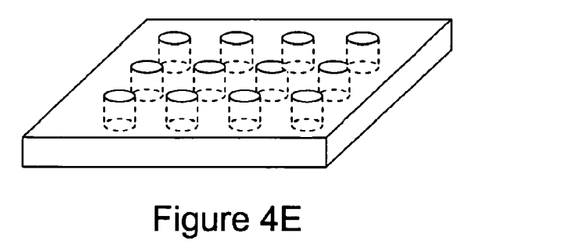

FIG. 4B illustrates an alternative configuration of tunable plasmonic filter according to a third embodiment of the invention, in which a control voltage or current is applied directly to the substrate of the metal plasmonic filter structure array. An substrate 405 is connected directly to the metal plasmonic filter structure array 101. For example, the array 101 may be formed directly on the substrate 405 or indirectly on the substrate 405 if one or more intervening layers are located between the array 101 and the substrate 405. The substrate 405 is connected to both polarity outputs of the voltage or current source 403, such that the control voltage or current is applied directly to both ends of the substrate. For display applications, the substrate 405 may comprise a transparent, conductive material, such as a plate shaped substrate. The intensity of the control signal can be dynamically increased or decreased at a fast speed, in a linear fashion or in a multi step fashion and its intensity modulates the intensity of the transmission light. In a preferred aspect of the third embodiment, the substrate 405 comprises a piezoelectric (also known as piezoresistive) material substrate. The substrate 405 changes shape (i.e., expands or shrinks) when a voltage or current is applied to the substrate. The changes in substrate shape affect the gap size between metallic islands or embossing structures of the plasmonic array 101. At the same time, the refractive index of the voltage applied area of the piezoelectric material of the substrate also changes. Both the gap size change and the refractive index change affect or modulate the intensity and/or the wavelength of the transmitted light. For display applications, the substrate 405 preferably comprises a transparent piezoelectric material.

Applications

The novel tunable plasmonic filtering functions that have been revealed and demonstrated with subwavelength scale of metallic structures proposed here are expected to bring a major impact on various fields that involves optics.

Figure 5A:
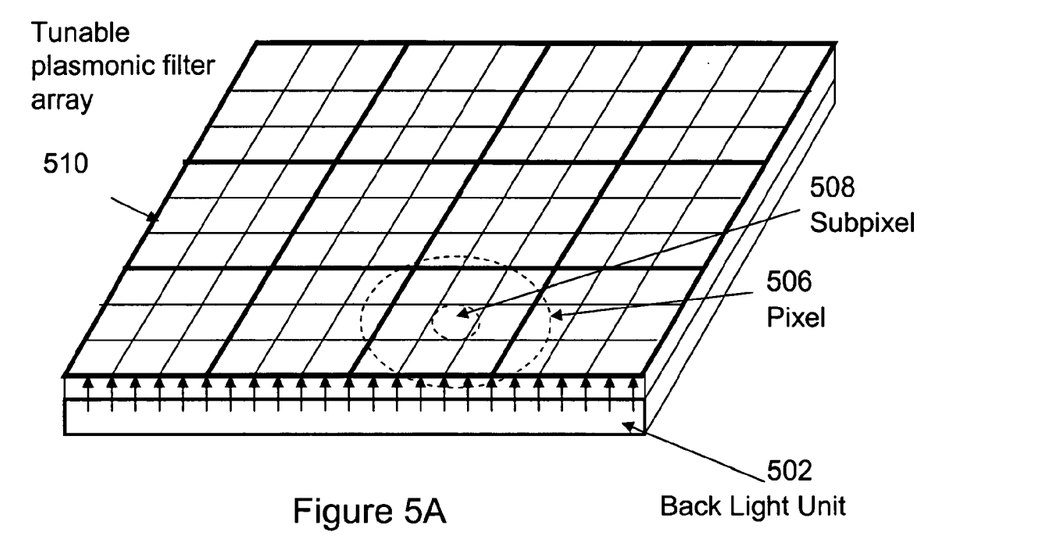
FIG. 5A is schematic representation of a flat panel display composed of tunable plasmonic filter array and a back light unit.
Figure 5B:
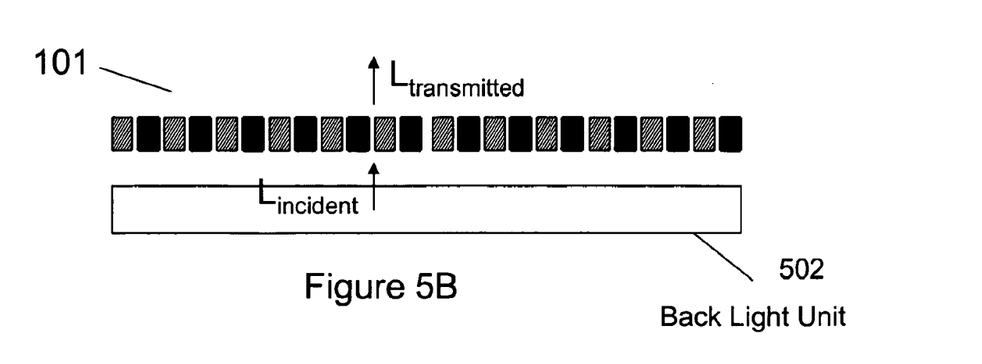
FIG. 5B is a cross sectional view of the flat panel display shown in FIG. 5A.

FIG. 5A is schematic illustration of a flat panel display comprising of tunable plasmonic filter in an array 510. Each cell or pixel 506 comprises at least three subcells or subpixels 508 shown in FIG. 5A. Each subcell 508 in a particular cell 506 is designed to transmit one particular color (or a narrow IR, VIS or UV radiation band). Each cell of array 510 is preferably identical to the other cells in the array because each cell contains same arrangement of subcells 508. Only selected waveband of the incident light to each subcell radiated from back light unit 502 is transmitted through each subcell resulting in a specific color or a spectra of the subcell. The intensity of the transmitted light is modulated by the control signal of the control circuit.

Figure 6A:
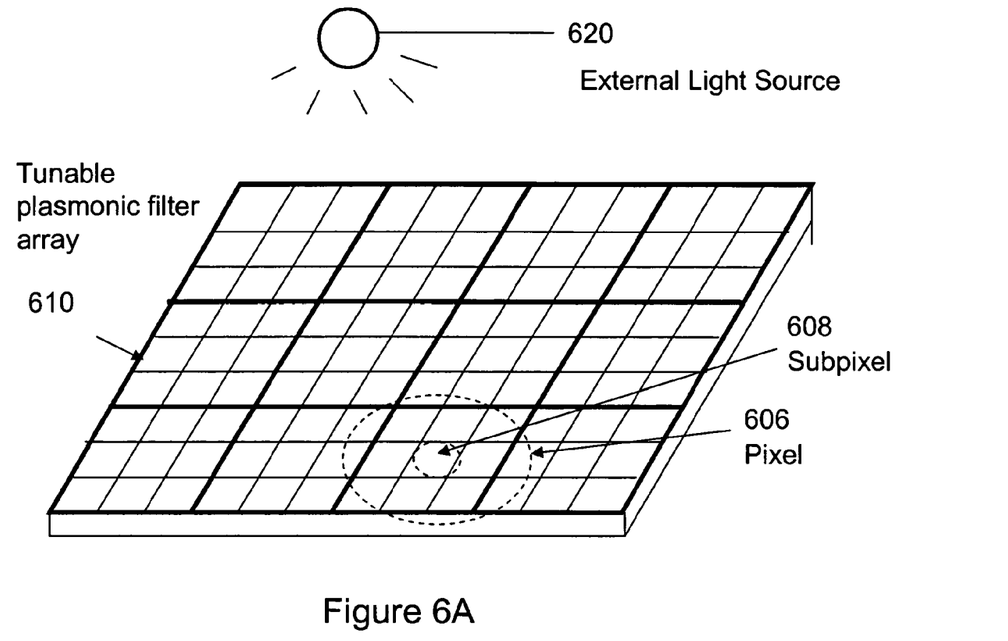
FIG. 6A is schematic representation of a flat panel display composed of tunable plasmonic filter array using external light source without internal backlight unit.
Figure 6B:
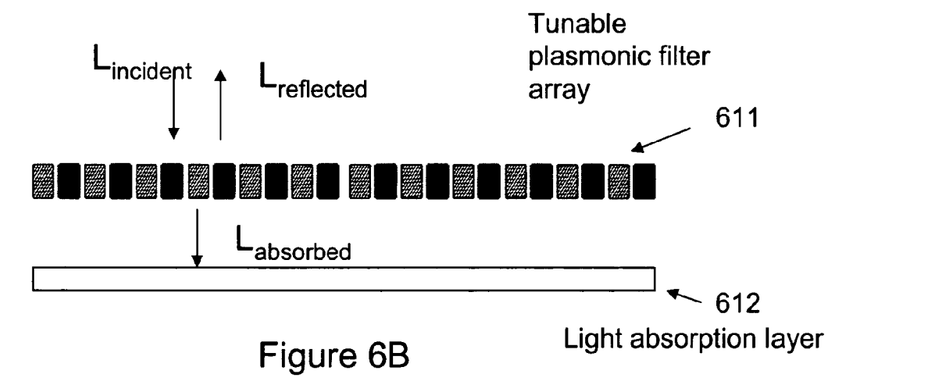
FIG. 6B is a cross sectional view of the flat panel display shown in FIG. 6A.

FIG. 6A is schematic illustration of an alternative flat panel display comprising of tunable plasmonic filter in an array 610. Each cell or pixel 606 comprises at least three subcells or subpixels 608 shown in FIG. 6A. Each subcell 608 in a particular cell 606 is designed to reflect one particular color (or a narrow IR, VIS or UV radiation band). Each cell of array 610 is preferably identical to the other cells in the array because each cell contains same arrangement of subcells 608. Only selected waveband of the incident light to each subcell radiated from external light unit 620 or natural light is reflected, resulting in a specific color or a spectra of the subcell and the rest of the spectra of the light is transmitted through each subcell and absorbed by a absorption layer 612 shown in FIG. 6B. The intensity of the transmitted light is modulated by the control signal of the control circuit.

Figure 7A:
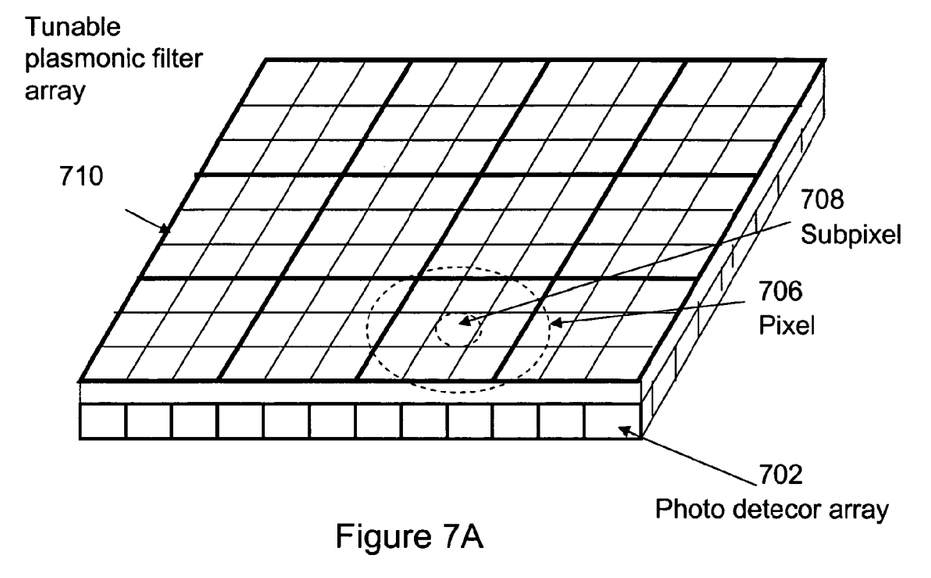
FIG. 7A is a schematic representation of a photo detector array integrated with tunable plasmonic filter array.

FIG. 7A is schematic representation of a multispectral imaging system 710, when a monochromator is extended to a two dimensional array configurations. The monochromator comprises a plasmonic tunable filter 710 and a photodetector array 702. Each cell or pixel 706 comprises at least three subcells or subpixels 708 shown in FIG. 7A. Each subcell 708 in a particular cell 706 is designed to transmit one particular color (or a narrow IR, VIS or UV radiation band). Each cell of array 710 is preferably identical to the other cells in the array because each cell contains same arrangement of subcells 708. The spectra of each subcell is further selected dynamically within the neighboring region of the transmission waveband of the subcell by the control signal, which provides more selection of the colors or narrow radiation wavebands than the number of subcells. A corresponding photodetector 702 pixel is located below each filter 710 pixel 706 to receive the light transmitted through the pixel 706.

A multispectral imaging system is a system which can form an image made up of multiple colors. One example of a multispectral imaging system is a digital color camera which can capture moving and/or still color digital images of objects or surroundings. Another example of a multispectral imaging system is an infrared camera, which forms a digital image in visible colors of objects emitting infrared radiation, such as a night vision camera. The camera contains a processor, such as a computer, a special purpose microprocessor or a logic circuit which forms a color image (i.e., as data which can be converted to visually observable image or as an actual visually observable image) based on radiation detected by the photodetector. The multispectral imaging system may store the color image in digital form (i.e., as data on a computer readable medium, such as a computer memory or CD/DVD ROM), in digital display form (i.e., as a still or moving picture on a screen) and/or as a printout on a visually observable tangible medium, such as a color photograph on paper.

Figure 7B:
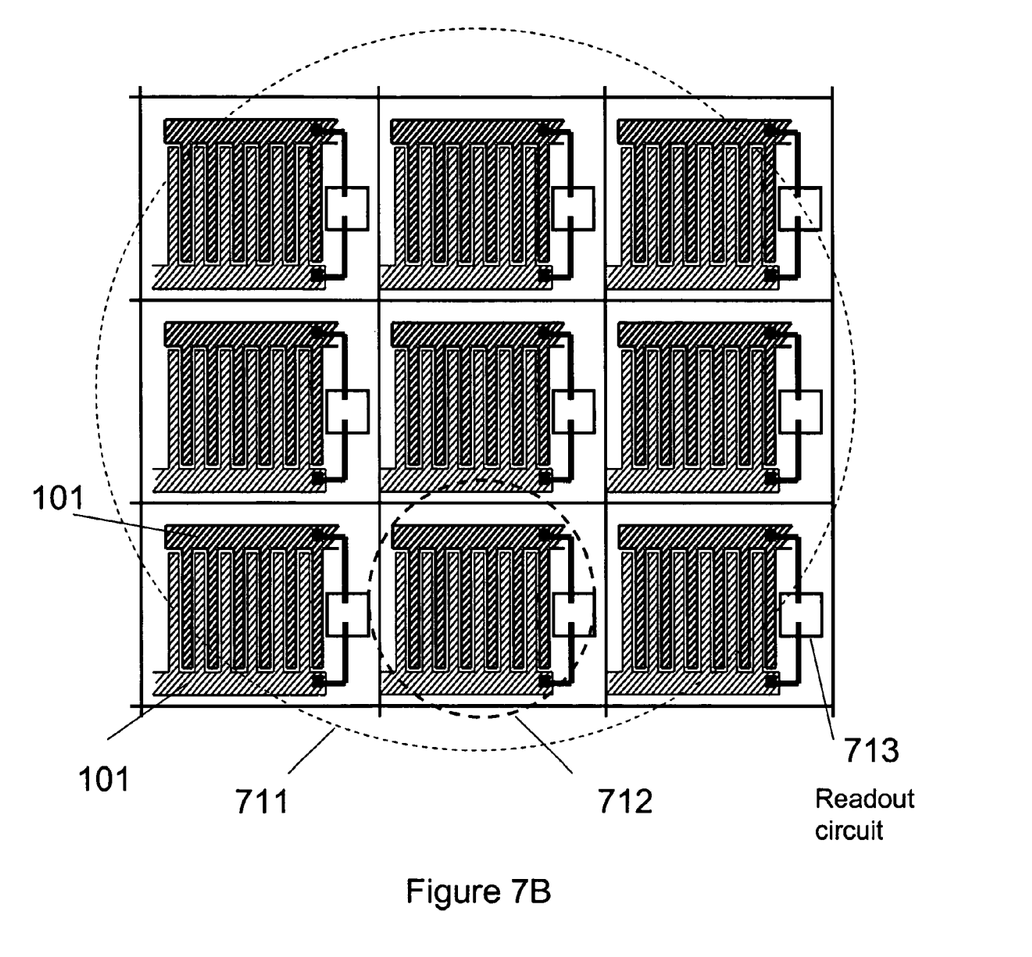
FIG. 7B is schematic representation of a photo detector array composed of tunable plasmonic filter and readout circuit.

FIG. 7B is a schematic representation of a photodetector array 710. Each subcell 712 in a particular cell 711 is designed to transform the radiation energy of one particular color (or a narrow IR, VIS or UV radiation band) incident onto the subcell into electric energy form (i.e., an output voltage or current which are provided through leads to a read out circuit 713). Each cell of array 710 is preferably identical to the other cells in the array because each cell contains same arrangement of subcells 712.

Figure 8:
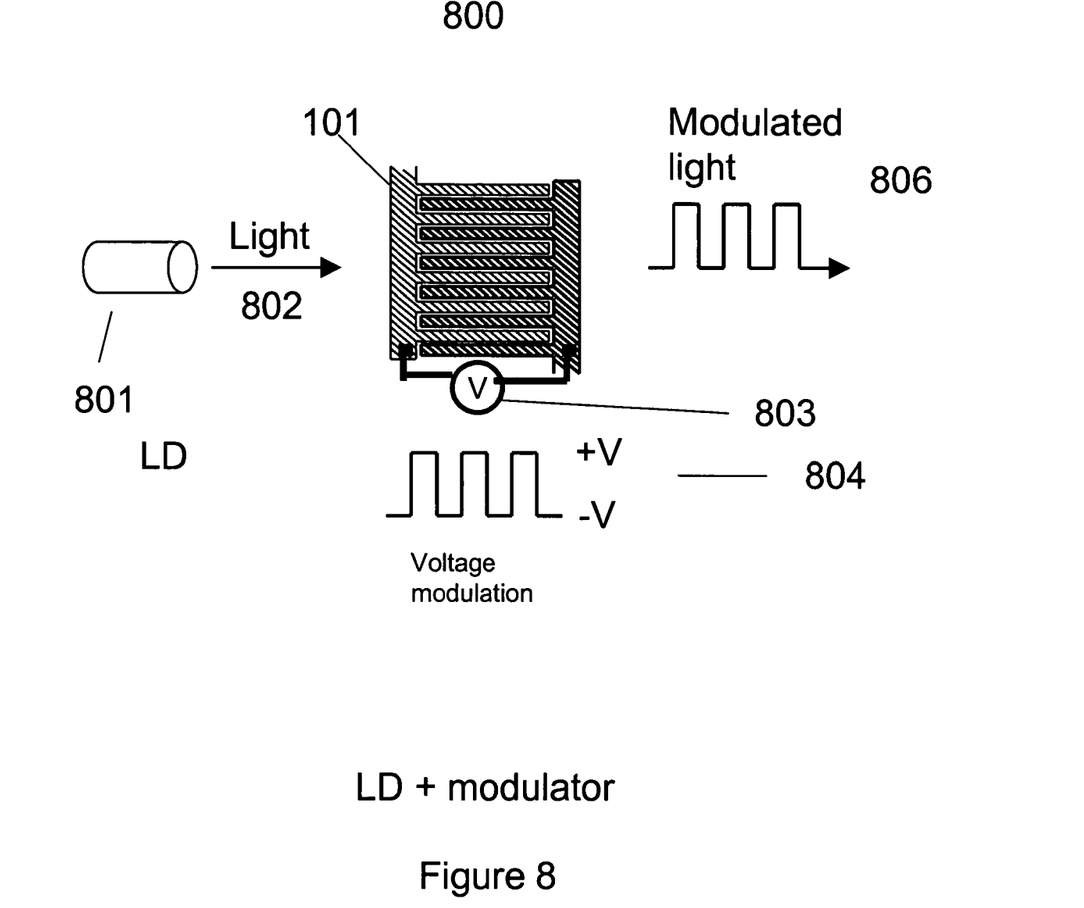
FIG. 8 is a schematic representation of an optical modulator composed of tunable plasmonic filter and light source.

FIG. 8 is schematic representation of an optical modulator 800. Continuous light output 802 from a light source 801, such as a laser diode, is modulated by the modulation signal 804, such as a voltage or current from source 803. The shape of output light from the modulator 800 is the modulated light output 806 which approximates the modulation signal 804. The optical modulator device is used for fiber optic communications, optical data storage, semiconductor and bio applications.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

What is claimed is:

1. A tunable plasmonic filter, comprising:
   a metal plasmonic filter comprising at least one of sub-wavelength sized plasmonic structures or apertures; and
   a modulating voltage or current source which in operation is operable for applying a voltage or current indirectly to, or between portions of, or to a substrate of the metal plasmonic filter to modulate at least one of intensity or wavelength of light transmitted through the filter,
   wherein the metal plasmonic filter comprises interdigitated plasmonic filter structures, and
   wherein the modulating voltage or current source is adapted to apply a voltage or current to a first part and a second part of the interdigitated plasmonic filter structures, and
   wherein the first and second parts of the interdigitated plasmonic filter structures are configured such that incident light is resonant with at least one plasmonic mode on the interdigitated plasmonic filter structures, and a predetermined wavelength perturbs the interdigitated plasmonic structures in surface plasmon energy bands for wavelength selective transmission of light.

2. A transmissive flat panel display comprising the filter of claim 1.

3. The flat panel display of claim 2, further comprising a light source which comprises a back light unit.

4. A reflective flat panel display comprising the filter of claim 1.

5. The flat panel display of claim 4, further comprising an external light source.

6. A multispectral imaging device comprising the filter of claim 1.

7. A photodetector array comprising the filter of claim 1.

8. An optical modulator comprising the filter of claim 1.

9. The filter of claim 1, wherein the modulating voltage or current source is operable for applying a voltage or current indirectly to, or between portions of, or to a substrate of the metal plasmonic filter to modulate intensity of light transmitted through the filter.

10. The filter of claim 1, wherein the modulating voltage or current source is operable for applying a voltage or current indirectly to, or between portions of, or to a substrate of the metal plasmonic filter to modulate wavelength of light transmitted through the filter.

11. A tunable plasmonic filter, comprising:
    a metal plasmonic filter comprising at least one of sub-wavelength sized plasmonic structures or apertures; and
    a modulating voltage or current source which in operation is operable for applying a voltage or current indirectly to, or between portions of, or to a substrate of the metal plasmonic filter to modulate at least one of intensity or wavelength of light transmitted through the filter, wherein the metal plasmonic filter is located between electrodes connected to the modulating voltage or current source, and wherein the metal plasmonic filter comprises plasmonic filter structures configured such that incident light is resonant with at least one plasmonic mode on the structures, and a predetermined wavelength perturbs the plasmonic structures in surface plasmon energy bands for wavelength selective transmission of light.

12. A tunable plasmonic filter, comprising:

a metal plasmonic filter comprising at least one of subwavelength sized plasmonic structures or apertures; and a modulating voltage or current source which in operation is adapted to apply a voltage or current indirectly to, or between portions of, or to a substrate of the metal plasmonic filter to modulate at least one of intensity or wavelength of light transmitted through the filter, wherein the metal plasmonic filter electrically contacts the substrate which is electrically connected to the modulating voltage or current source, and wherein the metal plasmonic filter comprises plasmonic filter structures configured such that incident light is resonant with at least one plasmonic mode on the structures, and a predetermined wavelength perturbs the plasmonic structures in surface plasmon energy bands for wavelength selective transmission of light.

13. An optical filtering method, comprising:

transmitting light through a metal plasmonic filter comprising at least one of subwavelength sized plasmonic structures or apertures, such that at least one plasmon mode on the filter is resonant with incident light to produce a transmitted filtered light; and modulating at least one of intensity or wavelength of the transmitted light by a voltage or current applied indirectly to, or between portions of, or to a substrate of the metal plasmonic filter;

wherein the step of transmitting light through the metal plasmonic filter comprises transmitting light through the metal plasmonic filter located between electrodes connected to the modulating voltage or current source; and wherein the metal plasmonic filter is configured such that a predetermined wavelength perturbs the plasmonic structures in surface plasmon energy bands for wavelength selective transmission of light.

* * * * *